United States Patent [19]

Willis

[11] Patent Number: 4,746,141

[45] Date of Patent: May 24, 1988

[54] DOOR CARRIER

[76] Inventor: William E. Willis, P.O. Box 37207, Tallahassee, Fla. 32315

[21] Appl. No.: 877,143

[22] Filed: Jun. 23, 1986

[51] Int. Cl.$^4$ .............................................. B25B 11/00
[52] U.S. Cl. ..................................... 280/655; 269/17; 280/47.29
[58] Field of Search ............... 280/655, 47.34, 79.1 A, 280/47.24, 47.27, 47.29; 248/166, 129; 269/16, 17, 905; 414/10

[56] References Cited

U.S. PATENT DOCUMENTS

| | | | |
|---|---|---|---|
| 2,503,388 | 4/1950 | Hedlund | 414/10 |
| 2,967,627 | 1/1961 | Vinson | 414/11 |
| 3,118,553 | 1/1964 | Rosenzweig | 280/47.34 X |
| 3,136,429 | 6/1964 | Kleinschmidt | 280/47.34 X |
| 3,643,935 | 2/1972 | Bell | 269/16 |
| 3,861,662 | 1/1975 | Morse | 269/17 |
| 4,050,671 | 9/1977 | Coleman | 269/17 X |
| 4,138,099 | 2/1979 | Englehart | 269/17 |
| 4,241,930 | 12/1980 | Bell et al. | 280/47.29 |
| 4,278,244 | 7/1981 | Carter | 269/17 |

Primary Examiner—John J. Love
Assistant Examiner—Michael Mar
Attorney, Agent, or Firm—Arthur G. Yeager

[57] ABSTRACT

Collapsible hand cart for carrying a door standing on edge, the cart comprising an elongated vertical beam having two vertically spaced pairs of guide flanges for receiving an edge of a door, the beam being hinged in the middle to fold back upon itself, a handle at the upper end of the beam for guiding the cart and two laterally spaced wheels mounted on an axle through the bottom of the cart for moving the cart, a pivotable horizontal channel support beam projecting outwardly at the bottom of the vertical beam to support an edge of the door, a foot at the upper end of the vertical beam to support the vertical beam in a level position when rotated to the horizontal.

20 Claims, 2 Drawing Sheets

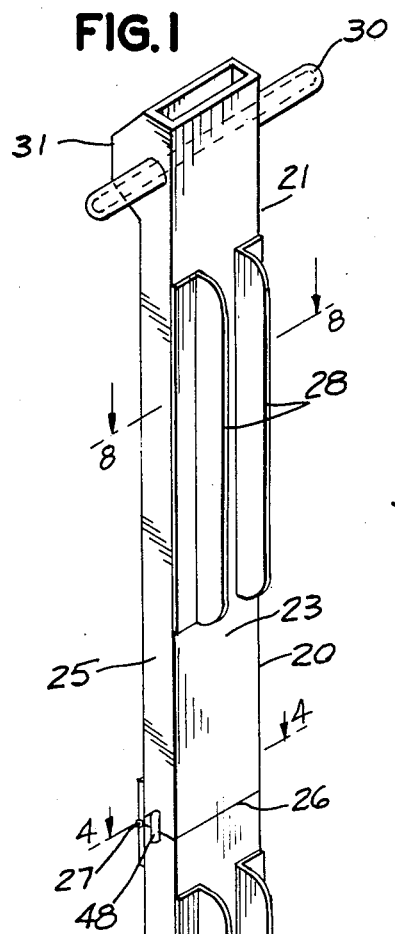
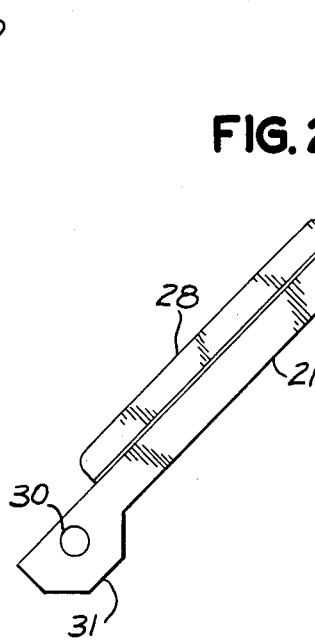
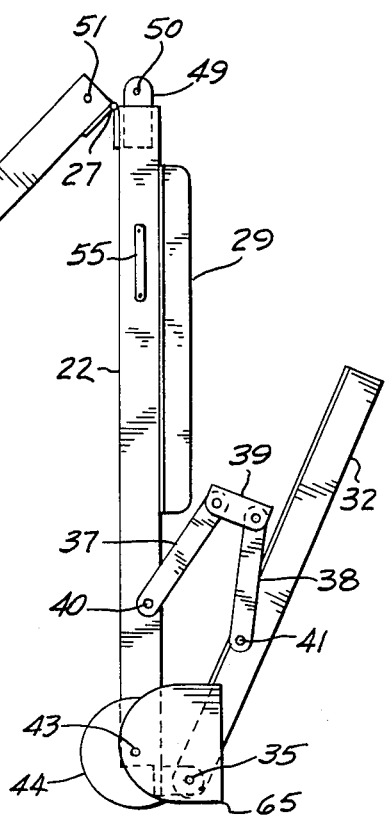
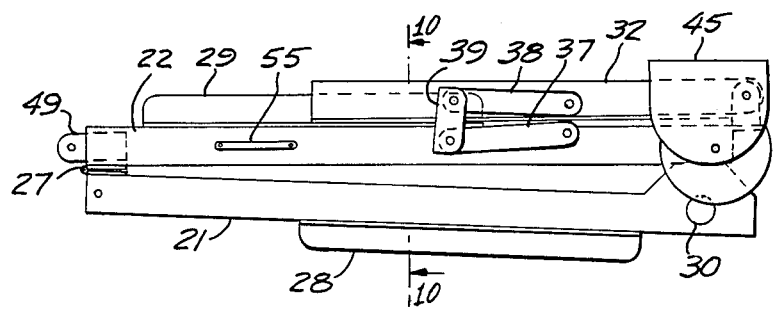
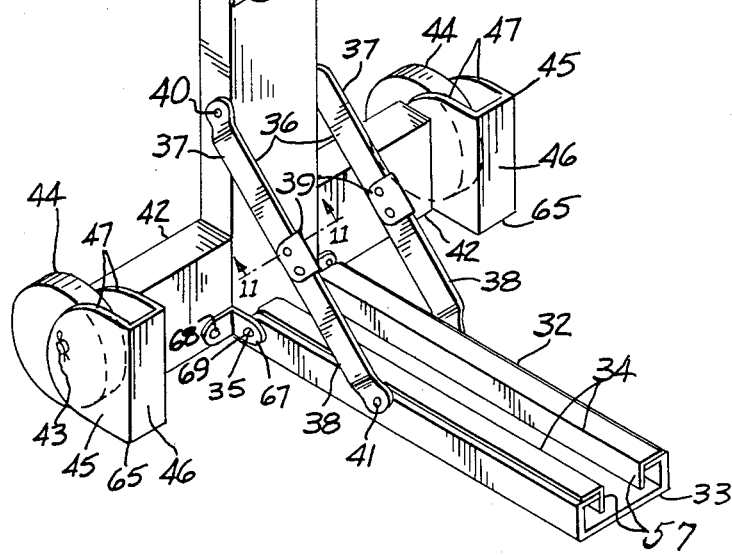

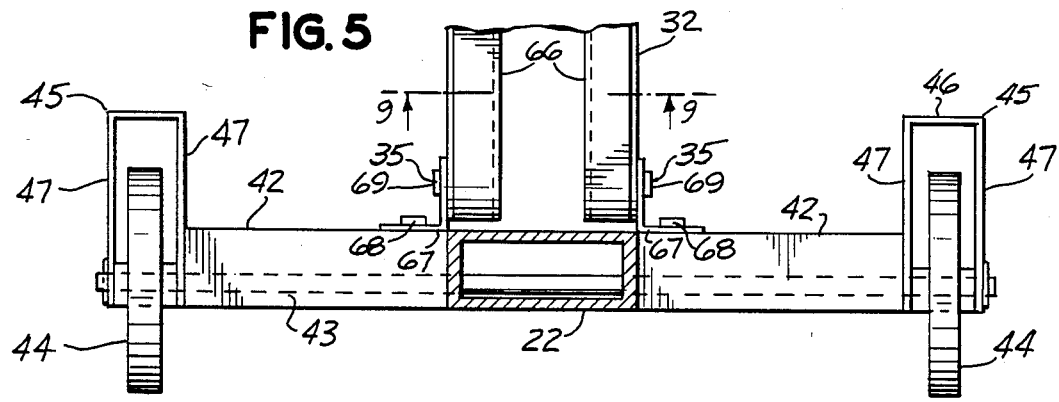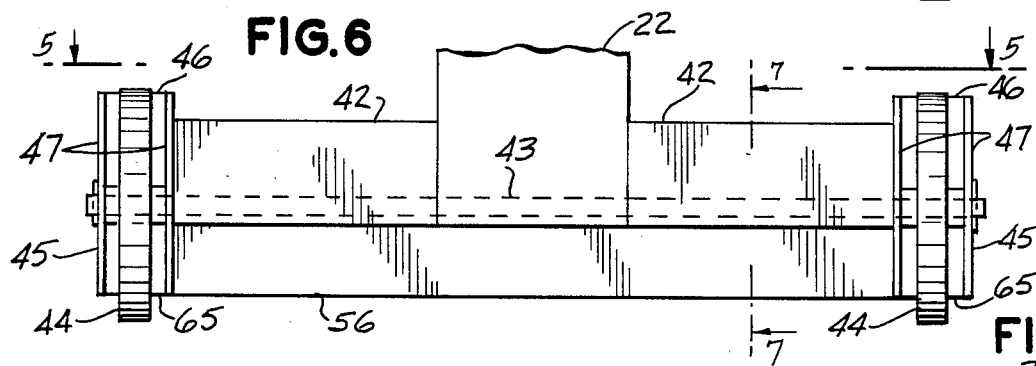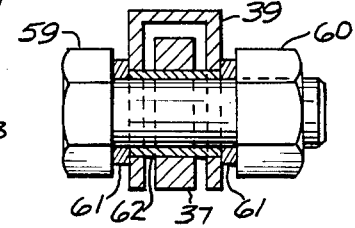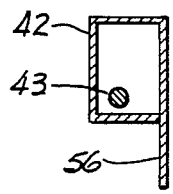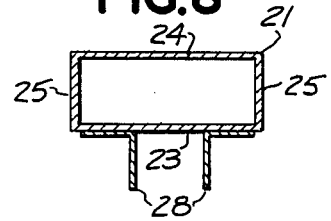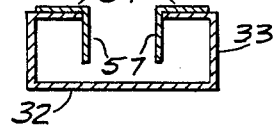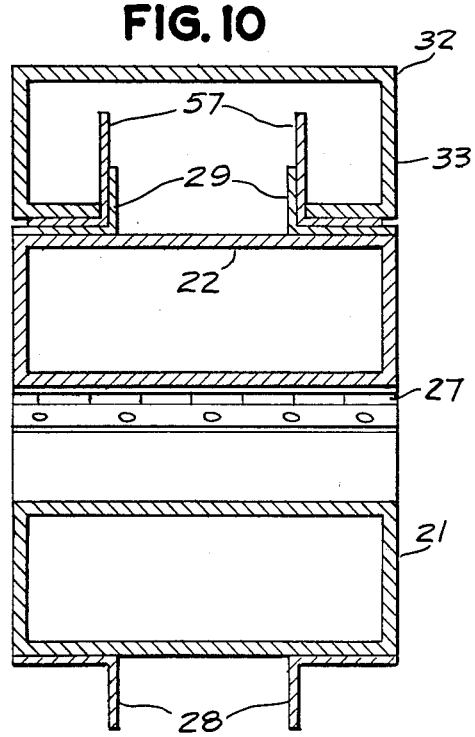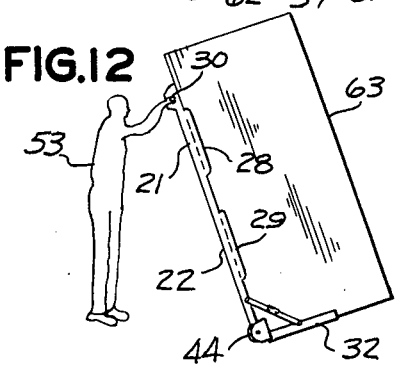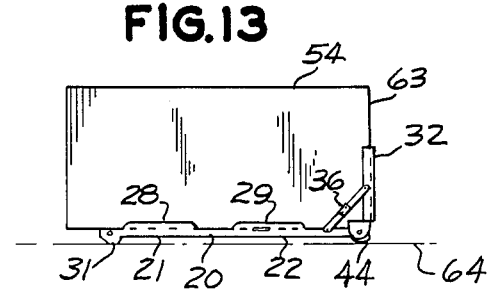

DOOR CARRIER

BACKGROUND OF THE INVENTION

In the construction of a residence or business office the fitting and hanging of doors is a difficult and awkward task. The door must, of course, be made to fit the door opening with reasonably close tolerances so that the door can be readily swung open or closed and, when closed, be reasonably snug around all edges. After fitting the door to the opening, hinges must be attached to one edge of the door and to a corresponding door jamb so the door will operate in a desirable manner. All fitting operations and hinge placements require that the door be held firmly on edge, and unless some type of mechanical jig or vise is employed, it requires two workers to do the job. Accordingly, there has been a need for a mechanical device to hold the door in a suitable position for those operations so that one man may work alone. Devices which have been known for such purposes are those described in U.S. Pat. Nos. 2,503,388; 2,967,627; 3,643,935; 3,861,662; 4,050,671; and 4,278,244. These devices, for the most part, include levering means and lifting jack mechanisms, and, therefore, are somewhat complicated. Furthermore, all of these devices are rather large and are not collapsible.

It is an object of this invention to provice a novel, simplified carrier for a door. It is another object of this invention to provide a novel collapsible door carrying device. Still other objects will become apparent from the more detailed description which follows.

BRIEF SUMMARY OF THE INVENTION

This invention relates to a foldable door carrier comprising an elongated vertical support beam hinged medially of its length to form an upper beam section and a lower beam section with said sections being foldable upon each other, each of said sections having a pair of parallel guide flanges aligned with each other and adapted to receive the edge of a door therebetween, said upper section having at its upper end a handle means for manually holding and guiding the carrier, said lower section having a pair of widely spaced wheels for transportation of said carrier, a horizontal support beam extending forwardly from the bottom of said lower beam section and pivotally attached thereto, said horizontal support beam having parallel spaced flanges extending lengthwise thereof and adapted to receive the edge of a door therebetween.

In a specific embodiment of this invention a foot member is included at the upper end of the vertical support beam such that when that beam is rotated to a horizontal position with the foot member on the same floor as the wheels, the vertical support beam will be horizontally level. In another specific embodiment pivotable angle braces are connected between the vertical and horizontal beams to provide weight carrying support for the horizontal beam and to permit the horizontal beam, when desired, to be folded against the vertical beam in a collapsed position. In still another embodiment, the wheels are provided with covers which provide means for pushing aside obstacles which might obstruct the rolling of the wheels.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a perspective view of the door carrier of this invention in a fully opened position;

FIG. 2 is a side elevational view of the door carrier of this invention in a partially collapsed position;

FIG. 3 is a side elevational view of the door carrier of this invention in a fully collapsed position;

FIG. 4 is a cross sectional view taken at 4—4 of FIG. 1;

FIG. 5 is a cross sectional view taken at 5—5 of FIG. 6;

FIG. 6 is a partial rear elevational view of the door carrier of this invention;

FIG. 7 is a cross sectional view taken at 7—7 of FIG. 6;

FIG. 8 is a cross sectional view taken at 8—8 of FIG. 1;

FIG. 9 is a cross sectional view taken at 9—9 of FIG. 5;

FIG. 10 is a cross sectional view taken at 10—10 of FIG. 3;

FIG. 11 is a cross sectional view taken at 11—11 of FIG. 1;

FIG. 12 is a schematic illustration of a worker moving a door on the carrier of this invention; and FIG. 13 is a schematic illustration of a door on the door carrier of this invention resting on the floor with the long axis of the door horizontal.

DETAILED DESCRIPTION OF THIS INVENTION

The general features of this invention are best seen in FIGS. 1-3. A vertical support beam 20 has an upper section 21 and a lower section 22 joined together with abutting edges at plane 26 by means of hinge 27. Beam 20 may be any suitable shape such as angle beam, channel, I-beam, H-beam, box beam, tubular shapes, and the like. A preferred shape is a rectangular tubular beam having a front surface 23, a rear surface 24, and two side surfaces 25. On front surface are two pairs of parallel flanges 28 and 29, the former being on upper section 21 and the latter being on lower section 22. It is convenient to make such flanges by using lengths of angle beams with one leg being affixed to front surface 23 and the other leg projecting forwardly. The forwardly projecting legs form flanges 28 and 29 which are parallel to each other and spaced apart laterally the thickness of a door so that the flanges will receive the edge of a door therebetween. Flanges 28 are aligned vertically with flanges 29 so as to provide two seats for the door edge.

At the top of upper section 21 there is a handle 30 which is used by the worker to manipulate the carrier. The preferred type of handle is a rod or tube projecting laterally outward from both of side surfaces 25 forming handles for two hands similar to those on the tongue of a child's wagon. Projecting outwardly from rear surface 24 is a foot member 31 which projects outwardly from rear surface 24 sufficiently to make beam 20 level when allowed to rest horizontally on the floor. This is explained in more detail with respect to FIG. 13.

At the lower end of lower section 22 is a pair of widely spaced wheels 44 which are employed to move the door carrier from place to place. Wheels 44 are mounted on an axle 43 passing through lower section 22. Axle covers 42 are tubular sections attached rigidly to side surfaces 25 or lower section 22. At the outer ends of axle covers 42 are wheel covers 45 attached rigidly to axle covers 42. Wheel covers 45 are channel structures having a flat planar base 46 and two perpendicular parallel flanges 47 which are spaced apart sufficiently for wheel 44 to roll therebetween. The lower front edge 65 of wheel cover 45 is spaced as far forward of axle 43 and as close to the floor as practical so as to push aside any scrap lumber, electrical appliances, that might be on the floor and interfere with the rolling wheels. Wheel covers 45 may also serve as journals for axle 43.

Horizontal support beam 32 extends perpendicularly forward from front surface 23 of lower section 22 at the lower end thereof. Support beam 32 includes a channel beam 33 and two angle beams 34 to provide parallel vertical flanges 57 that are spaced apart slightly more than the thickness of a door so as to receive the edge of a door therebetween. It can be appreciated that one lengthwise edge of a door is held by flanges 28 and 29 on vertical support beam 20 while an adjacent widthwise edge of the door is held between flanges 57.

Horizontal support beam 32 is pivotable at connection 35 so as to fold upward against front surface 23 of lower section 22. Any convenient pivotable connection may be used at 35. That shown here includes two angle brackets 67 rigidly affixed to axle covers 42 by fastener 68, which may be a bolt, rivet or the like. Pivotal movement is provided by pivot pin 69. In order to provide weight supporting strength to horizontal support beam 32 and to provide means for holding beam 32 in a collapsed position lying against lower section 22 a pair of angle braces 36 are included. Each angle brace 36 includes an upper strip 37 and a lower strip 38 pivotally attached to a channel connector 58. Upper strip 37 is pivotally connected at 40 to lower section 22, and lower strip 38 pivotally connected at 41 to horizontal support beam 32. It may be seen therefore that when upper strip 37 and lower strip 38 are linearly aligned as shown in FIG. 1 they function to support beam 32 and provide weight carrying strength thereto. When the door carrier is folded into a collapsed position strips 37 and 38 will pivot through the position shown in FIG. 2 to a fully collapsed position shown in FIG. 3. When fully collapsed the carrier may be carried by handle 55 on side surface 25 of lower section 22.

Since upper section 21 and lower section 22 are connected by hinge 27, it is necessary to employ a means for locking those sections into one vertical support beam 20. This may be accomplished by several alternate means, one of which is shown here in FIG. 4. Tongues 49 are attached to the inside of side surfaces 25 of lower section 22 at part plane 26. Tongues 49 are shaped to cause no obstruction to the pivoting of upper section 21 about hinge 27. Holes 50 through tongues 49 are aligned with holes 51 through the side walls of upper section 21 such that when upper section 21 and lower section 22 are aligned as in FIG. 1, a locking pin 48 is inserted through holes 50 and 51 to immobilize hinge 27. Preferably a cotter pin 52 or other locking means is attached to pin 48 to prevent it from being inadvertently withdrawn from holes 50 and 51.

In FIGS. 5–7 the details of the structure of axle covers 42, axle 43, wheels 44, and wheel covers 45 are seen; as well as the pivotal connection between horizontal support beam 32 and lower section 22. An additional feature shown in FIGS. 6 and 7 is skirt 56 which extends from one wheel cover 45 to the other wheel cover 45 connecting the lower edges of each. Skirt 56 provides additional stiffness and also helps to push aside obstructions that might impede the rolling of the carrier and its door.

FIGS. 8 and 9 show cross sections of vertical support beam 20 and horizontal support beam 32 respectively.

FIG. 11 shows a cross section through the knee connector 39. It may be seen that channel member 39 and upper strip 37 are pivoted about a pin comprising bolt 59 and nut 60 each separated from channel member 39 by a suitable washer 61, while the shank of bolt 59 is maintained in a bushing 62.

FIG. 10 shows a cross section of the collapsed structure of FIG. 3. The manner in which horizontal support beam 32 folds onto lower section 22 and parallel flanges 29 is shown. Flanges 29 nest within flanges 57 to make a completely collapsed structure.

In FIGS. 12 and 13 the manner in which the carrier of this invention is used is shown. A worker 53 can place his hands on handle 30 while a door 63 is being held on the carrier by flanges 28 and 29 and horizontal support beam 32. By tilting the carrier and door 63 toward him, worker 53 can move the door 63 to wherever it is needed. When it is important to work on door 63 by planing edge 54 or setting hinge plates on edge 54, the carrier can be rotated to allow vertical support beam 20 to assume a horizontal position with foot member 31 resting on the same floor 64 as wheels 44. This places door 54 automatically in a position with edge 54 level.

Preferably all parts of the carrier are made of aluminum for strength and lightness of weight. Other materials such as steel, plastic, wood, etc. are, of course, operable.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A foldable door carrier comprising an elongated vertical support beam hinged medially of its length to form an upper beam section and a lower beam section with said upper beam section being foldable rearwardly to a position substantially parallel with said lower beam section, each of said sections having a pair of parallel guide flanges aligned with each other and adapted to receive an edge of a door therebetween, said upper section having at its upper end a handle means for manually holding and guiding said carrier, said lower section having a pair of widely spaced wheels for rollable transportation of said carrier, a horizontal elongated support beam having one end portion adjacent to and extending forwardly from the bottom of said lower beam section, means for pivotally mounting said one end portion to said lower beam section adjacent its said bottom, said horizontal support beam being foldable rearwardly to a position substantially parallel to and in contact with said lower beam section, said upper beam section and said horizontal support beam being on opposite sides of said lower beam section while in a folded position, said horizontal support beam having parallel spaced flanges extending lengthwise thereof between said one end portion and the free end of said horizontal support beam and adapted to receive the edge of a door therebetween, said parallel spaced flanges and said pair of parallel guide flanges being in substantial alignment and forming a vertical plane into which is positionable a door and said flanges of said horizontal support beam being sufficiently spaced apart to permit said flanges of said lower beam section to be receivable therein.

2. The carrier of claim 1 wherein said vertical suport beam has a closed rectangular cross section having a front surface, a rear surface, and two side surfaces.

3. The carrier of claim 2 which additionally comprises a foot member projecting outwardly from said rear surface of said upper beam section adjacent said handle such that when said vertical support beam is placed in a horizontal position resting on said foot member and said wheels said support beam will be substantially level.

4. The carrier of claim 1 which additionally comprises a pair of angle brace members pivotally connected at one end thereof to said lower beam section spacedly above said means for pivotally mounting and at the other end thereof to said horizontal support beam spaced forwardly from said means for pivotally mounting, each said brace member being pivotally jointed medially of its length so as to fold upon itself when said horizontal support beam is pivoted to lie forwardly of and lengthwise along the length of said lower beam section.

5. The carrier of claim 1 wherein said horizontal support beam is a channel beam structure with the open side of said channel facing upward and forming said parallel spaced flanges.

6. The carrier of claim 2 wherein said guide flanges are elongated sections of angle beams with one leg of each said angle beam lying against said front surface adjacent respective side edges between said front surface and said side surfaces of said vertical support beam and the other leg projecting perpendicularly and forwardly therefrom.

7. The carrier of claim 2 wherein said handle comprises a rod-like member projecting outwardly from both said side surfaces of said upper beam section.

8. The carrier of claim 1 which additionally comprises a releasable locking means to prevent said upper and lower beam sections from being foldable upon each other.

9. The carrier of claim 8 wherein said locking means includes a pin insertable in aligned passageways in both said upper and lower beam sections.

10. The carrier of claim 1 which additionally comprises a horizontal axle for said wheels, a rigid axle cover attached to the lower end of said lower beam section, and a wheel protector adjacent each wheel projecting forwardly of said wheel and adapted to push aside any obstruction to the rolling wheel.

11. The carrier of claim 10 wherein said wheel protector comprises a channel wheel cover having a base and two upright flanges, said base being positioned parallel to said lower beam section and said flanges being positioned on each side respectively of said wheel.

12. The carrier of claim 11 wherein said base has a lower edge which is slightly higher in elevation than the lowest point on the circumference of said wheel.

13. The carrier as defined in claim 1 wherein said pair of guide flanges on said lower section are partially disposed within said parallel spaced flanges of said support beam when said support beam is in its folded position aganist said lower section.

14. A collapsible door carrier adapted to receive and transport a door standing on one of its edges, said carrier comprising a normally vertical elongated rectangular tubular beam having a front surface, a rear surface, and two side surfaces, and being laterally cut into an upper section and a lower section joined at said cut with a hinge to permit the upper sction to pivot to a collapsed position lying alongside and rearwardly of said lower section, said lower section having an axle cover member extending laterally outward from each said side surface adjacent the lower end of said lower section, an axle extending through said axle cover, a pair of wheels rotatably mounted on said axle at the lateral end respectively of each said axle cover, a rigid wheel cover attached respectively to each said axle cover and extending forwardly of said wheel with the lowest portion of said wheel cover at its forward extremity being slightly higher in elevation than the lowest portion on the circumference of said wheel, a channel support beam extending perpendicularly outward and forward from the lower end of said front surface of said lower section, pivot means attached between said channel support beam and said lower section so that said channel support beam may selectively lie lengthwise along the front surface of said lower section while in a collapsed position, said channel beam having the open side of said channel facing upward and adapted to receive the edge of a door therein, said upper and lower sections each including a front surface thereof, a pair of parallel guide flanges projecting outwardly from said front surface in alignment to receive an edge of a door therebetween, said open side of said channel and said pair of parallel guide flanges being in substantial alignment and forming a vertical plane into which is positionable a door, said upper section including at its upper end a handle means for manually holding, guiding and propelling said carrier and a foot support projecting outwardly from the rear surface of said upper section adjacent the upper end thereof substantially the amount that the circumference of said wheels projects outwardly from said rear surface of said lower section.

15. The carrier of claim 14 wherein said handle comprises a cylindrical rod extending outward from said side surfaces substantially perpendicular thereto.

16. The carrier of claim 14 which additionally includes a pin and cooperating passageways through said side surfaces of both of said upper and lower sections adjacent said hinge whereby insertion of said pin in said passageways immobilizes said hinge.

17. The carrier of claim 14 which additionally includes a pair of foldable angle braces attached at one end to said lower section above said pivot means and at the other end to said channel support beam spaced forwardly from said pivot means.

18. The carrier of claim 17 wherein each said brace comprises two strips pivotally joined to each other at one end with the other ends of said strip pivotally connected respectively to said lower section and said channel support beam.

19. The carrier of claim 14 wherein each said wheel cover is a channel section comprising a flat base strip portion and two upright semicircular flanges, said flat base strip portion facing forwardly and said flanges being positioned on each side of a wheel.

20. The carrier of claim 14 wherein said open side of said channel beam at least partially receives said pair of parallel guide flanges of said lower section when said support beam is folded to lie lengthwise along the front surface of said lower section.

* * * * *